United States Patent [19]

Morehouse, Jr. et al.

[11] 4,075,134
[45] Feb. 21, 1978

[54] EMULSION POLYMERIZATION METHOD FOR PREPARING MICROSPHERES HAVING LIQUID CENTER AND SEAMLESS RIGID WALLS

[75] Inventors: Donald S. Morehouse, Jr., Midland, Mich.; Frank H. Bolton, deceased, late of Midland, Mich.; by Kathryn M. Bolton, administratrix, Grand Rapids, Mich.

[73] Assignee: The Dow Chemical Company, Midland, Mich.

[21] Appl. No.: 401,474

[22] Filed: Sept. 27, 1973

Related U.S. Application Data

[63] Continuation-in-part of Ser. No. 44,592, June 8, 1970, which is a continuation-in-part of Ser. No. 805,908, March 10, 1969, abandoned.

[51] Int. Cl.² .............................................. C08L 25/04
[52] U.S. Cl. ..................... 260/29.6 RW; 260/2.5 B; 260/29.6 R; 260/29.6 SQ; 260/29.6 MQ; 260/29.7 W; 260/29.7 UP; 260/29.7 SQ
[58] Field of Search ............... 260/29.6 RW, 29.6 SQ, 260/29.6 MQ, 29.6 R, 2.5 B, 29.7 W; 264/4; 117/100 A; 252/316

[56] References Cited

U.S. PATENT DOCUMENTS

| 2,914,499 | 11/1959 | Sheetz | 260/29.6 SQ |
|---|---|---|---|
| 2,923,734 | 2/1960 | Sheetz | 260/29.6 SQ |
| 2,969,331 | 1/1961 | Brynko et al. | 264/4 |
| 3,177,172 | 4/1965 | Adams | 260/29.6 SQ |

*Primary Examiner*—Harold D. Anderson
*Attorney, Agent, or Firm*—Michael S. Jenkins

[57] ABSTRACT

Aqueous dispersions of normally solid, organic polymeric particles are prepared by (1) dispersing an oil phase containing at least one emulsion polymerizable monomer such as styrene in an aqueous phase containing a stabilizing emulsifier such as sodium dodecyl benzene sulfonate and a polymer of a sulfohydrocarbyl ester of an $\alpha$, $\beta$-ethylenically unsaturated carboxylic acid such as a 2-sulfoethyl methacrylate/n-butyl acrylate copolymer and (2) subjecting the dispersion to emulsion polymerization. Microspheres having liquid centers and seamless rigid walls of a normally solid, organic polymer are prepared according to the above method except that the starting oil phase also contains a non-polymerizable, water-insoluble liquid such as hexane.

20 Claims, No Drawings

EMULSION POLYMERIZATION METHOD FOR PREPARING MICROSPHERES HAVING LIQUID CENTER AND SEAMLESS RIGID WALLS

CROSS REFERENCE TO RELATED APPLICATIONS

This invention is a continuation-in-part of application Ser. No. 44,592 filed June 8, 1970 pending which is a continuation-in-part of application Ser. No. 805,908 filed Mar. 10, 1969, now abandoned.

BACKGROUND OF THE INVENTION

This invention relates to a method for preparing aqueous dispersions of organic polymers, and more particularly, to an emulsion polymerization method carried out in the presence of a stabilizing emulsifier and a polymer of a sulfohydrocarbyl ester of an $\alpha,\beta$-ethylenically unsaturated carboxylic acid. A main embodiment of this invention relates to the preparation of microspheres having liquid centers and seamless rigid walls of an organic polymer.

Microspheres encompassing various kinds of liquids are quite useful in the plastic industry. For example, hollow thermoplastic microspheres are utilized as lightweight fillers for paints and paper coatings. Also porous foams are often prepared by heating thermoplastic microspheres having volatile liquid centers. These porous foams have many useful properties such as light weight, high insulating character, and buoyancy. Such foams have been used in diverse fields such as packaging, refrigeration, flotation equipment, construction and the like. Various liquids are also encapsulated for ease of handling and the like, and later released from the capsule by diffusion, pressure rupture, heat, etc. Examples are insecticides, pharmaceuticals, inks, fire retardants and the like.

Conventionally microspheres having liquid centers are prepared by suspension polymerization processes. In such processes liquids are usually encapsulated in the microspheres by dispersing the liquid to be encapsulated in the monomer phase before polymerization. Known suspension polymerization procedures for encapsulating liquids comprise the steps of (1) suspending the monomeric components and the liquid to be encapsulated in water with the aid of a suspension stabilizer such as colloidal silica and (2) polymerizing the monomeric components by adding an oil-soluble, free radical type catalyst and a small amount of heat. Unfortunately, suspension polymerization proceeds at a relatively slow rate. Also microspheres having diameters less than 2 microns which are often desired in certain coating compositions are not readily prepared by suspension polymerization. While solid polymer particles having diameters less than 2 microns are easily prepared by emulsion polymerization, microspheres having liquid centers cannot be satisfactorily prepared by ordinary emulsion polymerization methods. The difficulty in preparing microspheres by conventional emulsion polymerization is due to the nature of emulsion polymerization which involves the migration of unreacted monomer from the oil phase through the aqueous phase to a micelle where the monomer is then polymerized. As a result the liquid to be encapsulated appears as a separate oil phase.

In view of the potential utility of polymer particles having a uniform size, particularly small microspheres having liquid or hollow centers, and the lack of a suitable method for preparing them, it would be highly desirable to provide such a suitable method.

SUMMARY OF THE INVENTION

The present invention is a method for preparing aqueous dispersions of normally solid, organic polymeric particles, said method, as hereinafter described in detail, comprising the steps of (1) dispersing an oil phase comprising at least one emulsion polymerizable monomer in an aqueous phase containing from about 0.5 to about 4 weight percent based on total monomer of a stabilizing emulsifier and from about 0.2 to about 2 weight percent based on total monomer of a polymer of a sulfohydrocarbyl ester of an $\alpha,\beta$-ethylenically unsaturated carboxylic acid, said polymer containing at least about one milliequivalent of sulfo groups ($SO_3^-$) per gram of polymer, said total monomer of the oil phase being capable of polymerization to form a water-insoluble polymer, and (2) subjecting the dispersion to emulsion polymerization conditions such that the total monomer polymerizes to form particles of water-insoluble polymer. Polymeric particles of these aqueous dispersions generally have average diameters ranging from about 0.5 to about 20 microns, with some particles having diameters up to about 45 microns.

The essence of this invention resides in the use of a polymer of a sulfohydrocarbyl ester of an $\alpha,\beta$-ethylenically unsaturated carboxylic acid as a coalescing aid in an emulsion polymerization process.

The aqueous dispersions are useful in themselves as coating compositions such as paints and are especially useful for the preparation of foam rubber. In addition, these aqueous dispersions may be concentrated to higher solids dispersions, or particles thereof may be filtered from the dispersions and used as fillers, etc.

Of particular interest in this invention is a method for preparing microspheres having liquid centers and seamless rigid walls of a normally solid, organic polymer. Accordingly, such microspheres are prepared by a method comprising the steps of (1) intimately admixing at least one non-polymerizable, water-insoluble liquid with at least one emulsion polymerizable monomer, said liquid being soluble in the monomer and insoluble in the resulting organic polymer; (2) dispersing the resulting oil mixture in an aqueous phase containing from about 0.5 to about 4 weight percent based on total monomer of a stabilizing emulsifier and from about 0.2 to about 2 weight percent based on total monomer of a polymer of a sulfohydrocarbyl ester of an $\alpha,\beta$-ethylenically unsaturated carboxylic acid, said polymer containing at least about one milliequivalent of sulfo groups per gram of polymer, said total monomer of the oil phase being capable of polymerization to form a water-insoluble polymer; and (3) subjecting the dispersion to emulsion polymerization conditions such that the total monomer polymerizes to form microspheres of a water-insoluble polymer encapsulating said non-polymerizable liquid.

Microspheres prepared in accordance with the method of this invention have average diameters ranging from about 0.5 to about 20 microns, with some microspheres having diameters up to about 45 microns. These microspheres can be utilized as expandable spheres in the fabrication of porous foams. Thermoplastic microspheres encapsulating liquids are also useful in the production of insecticides, pharmaceuticals, inks, fire retardants and the like. Additionally it is possible to remove the liquid by evaporation or a similar means, thus leaving a hollow microsphere which serves as an excellent lightweight filler for paints or paper coatings. Microspheres having polymeric liquid centers are useful in the production of multipurpose plastic materials.

DESCRIPTION OF THE PREFERRED EMBODIMENTS

The method of this invention requires, as starting materials, (1) at least one emulsion polymerizable monomer, (2) a polymer of a sulfohydrocarbyl ester of an α,β-ethylenically unsaturated carboxylic acid, said polymer acting as a coalescing aid, and (3) a stabilizing emulsifier. In the preparation of microspheres having liquid centers by the method of this invention, a non-polymerizable, essentially water-insoluble liquid is employed in addition to the aforementioned starting materials.

Monomers suitable for preparing organic polymeric particles according to the method of this invention polymerize under emulsion polymerization conditions to form water-insoluble polymers. Representative of such monomers are ethylenically unsaturated monomers such as the monovinylidene aromatic compounds, the acyclic conjugated dienes, the esters of α,β-ethylenically unsaturated carboxylic acids, and other ethylenically unsaturated monomers such as the ethylenically unsaturated halides and nitriles and aliphatic α-olefins.

The monovinylidene aromatic compounds are represented by styrene, substituted styrenes (e.g., styrene having halogen, alkoxy, cyano or alkyl substituents), vinyl naphthalene and the like. Specific examples are styrene, α-methylstyrene, ar-methylstyrene, ar-ethylstyrene, α,ar-dimethylstyrene, ar,ar-dimethylstyrene, ar-t-butylstyrene, methoxystyrene, ar,ar-diethylstyrene, acetylstyrene, monochlorostyrene, dichlorostyrene, other halostyrenes and vinylnaphthalene.

In this specification and claims, by the word "monovinylidene" in the term "monovinylidene aromatic" monomer or compound is meant that to an aromatic ring in each molecule of the monomer or compound is attached one radical of the formula,

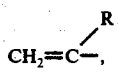

wherein R is hydrogen or a lower alkyl such as an alkyl having from 1 to 4 carbon atoms, e.g., methyl, ethyl, n-propyl, n-butyl and isobutyl.

The acyclic conjugated dienes operable in the practice of this invention include butadiene and substituted butadiene and other acyclic compounds having at least two sites of ethylenic unsaturation separated from each other by a single carbon-to-carbon bond. Specific examples are 2-methyl-1,3-butadiene, 2,3-dimethyl-1,3-butadiene, piperylene, 2-neopentyl-1,3-butadiene, and other hydrocarbon homologs of 1,3-butadiene, and, in addition, the substituted dienes, such as 2-chloro-1,3-butadiene, 2-cyano-1,3-butadiene, the substituted straight-chain conjugated pentadienes, the straight and branch-chain hexadienes, and others.

Suitable esters of α,β-ethylenically unsaturated carboxylic acids include the alkyl acrylates in which the alkyl portion has from 1 to 12 carbon atoms, e.g., methyl acrylate, methyl methacrylate, ethyl acrylate, ethyl methacrylate, n-propyl acrylate, n-propyl methacrylate, isopropyl acrylate, isopropyl methacrylate, n-butyl acrylate, n-butyl methacrylate, isobutyl acrylate, isobutyl methacrylate, 2-ethylhexyl acrylate, 2-ethylhexyl methacrylate, n-octyl acrylate, n-octyl methacrylate, n-decyl methacrylate, and dodecyl methacrylate; the esters of α,β-ethylenically unsaturated dicarboxylic acids, e.g., methyl maleate, ethyl fumarate, propyl citraconate, and butyl itaconate; and the like.

Other suitable ethylenically unsaturated monomers include chloro-substituted aliphatic monoethylenically unsaturated monomers such as vinyl chloride and vinylidene chloride; the acrylonitriles such as acrylonitrile and methacrylonitrile; ethylenically unsaturated esters of saturated carboxylic acids such as vinyl acetate and vinyl propionate; the ethylenically unsaturated ketones such as methyl ispropenyl ketone, the aliphatic α-olefins such as ethylene and the like.

Often, it is preferable to copolymerize small amounts, i.e., up to about 10 weight percent based on the polymer of other ethylenically unsaturated special purpose monomers, with the aforementioned monomers in the practice of this invention. Representatives of such special purpose monomers are the α,β-ethylenically unsaturated carboxylic acids such as acrylic acid, methacrylic acid, fumaric acid and the like; crosslinking, polyethylenically unsaturated emulsion polymerizable monomers such as divinyl benzene; and others such as 2-hydroxyethyl acrylate, 2-sulfoethyl methacrylate, and the like.

It is understood, however, that any emulsion polymerizable ethylenically unsaturated monomer which is inert to the copolymer of the sulfohydrocarbyl ester is suitably employed in the practice of this invention provided that the total emulsion polymerizable monomer will polymerize to form a water-insoluble polymer.

Of the suitable monomers, particularly advantageous monomers include styrene and methyl methacrylate. Of the monomers often beneficially employed in small quantities, it is found that the use of divinylbenzene as a crosslinking agent in the monomeric mixture substantially increase the percent of liquid which can be encapsulated. However, the use of divinylbenzene and othr crosslinking agents is preferably limited to concentrations up to about 3.0 percent by weight based on the monomer weight in order to avoid formation of significant amounts of coagulum during polymerization.

Liquids which are encapsulated by the process of this invention are substantially inert, i.e., non-reactive with the monomer or with the polymer formed. Liquids suitable for this purpose are non-polymerizable and do not inhibit the emulsion polymerization of the monomeric components. Such liquids are generally soluble in the monomeric phase and insoluble in the resulting polymer.

While particular liquids which are suitable depend on the particular monomer phase and resulting polymer, the following liquids are generally suitable in the systems contemplated by this invention.

Examples of such suitable liquids include the inert hydrocarbons and halo-hydrocarbons, e.g., hexane, neopentane, carbon tetrachloride and the like; the aromatic hydrocarbons and halogen-substituted aromatic hydrocarbons, e.g., benzene, toluene, chlorobenzene and the like; the chlorofluorocarbons, e.g., trichlorofluoromethane, difluorodichloromethane, trifluorochloromethane, etc; and the tetraalkyl silanes, e.g., tetramethyl silane, trimethyl ethyl silane, trimethyl isopropyl silane and the like. Also included are liquid polymers having the aforementioned properties, for example, low molecular weight polymers of the α-olefins, e.g., ethylene, propylene, butene-1 and the like; of conjugated diolefins, e.g., butadiene and isoprene; of the monovinylidene aromatic compounds, e.g., styrene, α-methylsytrene, t-butylstyrene, ar-methylstyrene and the like; of other ethylenically unsaturated monomers, e.g., vinyl chloride, acrylonitrile, acrylamide and the like. In accordance with this invention, oil solutions of various solids such as the normally solid, organic polymers and the like may also be encapsulated. Of the more volatile liquids, neohexane and neopentane are preferred, and a preferred liquid polymer is low molecular weight polybutadiene.

Coalescing aids utilized in the method of this invention are polymers of sulfohydrocarbyl esters of α,β-ethylenically unsaturated carboxylic acids. Such sulfohydrocarbyl ester polymers are at least inherently water-dispersible, and are preferably water-soluble. By "inherently water-dispersible" is meant capability of forming a colloidal dispersion in water in the absence of chemical dispersing aids such as surfactants, emulsifiers, etc. Sulfohydrocarbyl ester polymers usually contain from about 1 to about 5.5, preferably from about 1 to about 2.6, milliequivalents of sulfo groups ($SO_3^-$), whether in form of the acid and/or salt, per gram of the sulfohydrocarbyl ester polymer. Normally, sulfohydrocarbyl ester polymers containing at least 10 mole percent of the polymerized sulfohydrocarbyl ester, preferably at least about 15 mole percent, are sufficient to provide the preferred proportion of sulfo ($SO_3^-$) groups. So long as the sulfohydrocarbyl ester polymer is at least inherently water-dispersible, molecular weight of the polymer is not particularly critical. Accordingly polymers having average molecular weights from about 5,000 up to about 3 million are suitable, with polymers having average molecular weights in the range from about 10,000 to about 200,000 being preferred.

It is further understood that both homopolymers and copolymers of two or more of the sulfohydrocarbyl esters and copolymers of one or more of the sulfohydrocarbyl esters and one or more ethylenically unsaturated monomers are suitable coalescing aids in the practice of this invention.

By the term "sulfohydrocarbyl ester" is meant an ester of the named carboxylic acid wherein the ester moiety is represented by the formula:

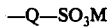

$$-Q-SO_3M$$

wherein Q is a divalent organic radical having a hydrocarbon backbone and having its valence bonds on different carbons and M is a cation which disassociates from $-SO_3^-$ in water. It is understood that Q may contain any substituent group provided that it does not react with the sulfo group to form a water-insoluble salt or otherwise chemically alter the sulfo group such that the sulfo group cannot exist as the sulfonate anion when the sulfohydrocarbyl ester is dispersed or dissolved in water and does not interfere with the emulsion polymerization of the aforementioned monomers and thereby prevent the formation of a water-insoluble polymer therefrom. Accordingly, Q may contain such substitutents as alkyl, halo, haloalkyl, alkoxy, aryl, aryloxy, and the like. Exemplary Q include alkylene, cycloalkylene, arylene, aralkylene, haloalkylene, haloarylene, haloalkylalkylene, alkoxyalkylene, aryloxyalkylene, alkoxyarylene and aryloxyarylene. Exemplary M include hydrogen ion, ammonium and metal cation such as cations of the alkali metals, e.g., sodium and potassium.

Coalescing aids which are particularly suited for the purposes of this invention are copolymers of a sulfohydrocarbyl and one or more ethylenically unsaturated comonomers copolymerizable therewith which comonomers will not react with the sulfo group to form a water-insoluble salt or otherwise chemically alter the sulfo group such that the sulfo group cannot exist as a sulfonate anion when the sulfohydrocarbyl ester polymer is dispersed or dissolved in water. Further said comonomer in copolymerized form must not interfere with the emulsion polymerization of the aforementioned emulsion polymerizable monomers and thereby prevent the formation of a water-insoluble polymer therefrom.

Exemplary sulfohydrocarbyl esters which polymerize to form suitable coalescing aids include the sulfohydrocarbyl esters of α-methylene carboxylic acids described in U.S. Pat. No. 3,024,221 as having the structure

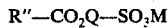

$$R''-CO_2Q-SO_3M$$

wherein R'' is vinyl or α-substituted vinyl, Q is a divalent organic radical having its valence bond or different carbon atoms such as alkylene radical having at least two carbon atoms and M is hydrogen ammonium base or metal in cation form. Also suitable are the mono- and di-sulfohydrocarbyl esters of ethylenically unsaturated vicinal dicarboxylic acids described in U.S. Pat. No. 3,147,301 including the sulfonate salts of such esters. It is further understood that sulfohydrocarbyl esters of other α,β-ethylenically unsaturated carboxylic acids such as aconitic acid, citraconic acid and the like are also suitable. For the purposes of illustration and not limitation, the following examples of preferred sulfohydrocarbyl esters are given: the sulfohydrocarbyl esters of α-methylene carboxylic acids, e.g., 2-sulfoethyl acrylate, 2-sulfoethyl methacrylate, 2-sulfoethyl α-ethylacrylate, 2-sulfoethyl α-propylacrylate, 2-sulfoethyl α-butylacrylate, 2-sulfoethyl α-hexylacrylate, 2-sulfoethyl α-cyclohexylacrylate, 2-sulfoethyl α-chloroacrylate, 2-sulfo-1-propyl acrylate, 2-sulfo-1-propyl methacrylate, 1-sulfo-2-propyl acrylate and methacrylate, 3-sulfo-2-butyl acrylate and methacrylate, 3-chloro-2-sulfo-1-propyl acrylate, 1-chloro-2-(chloromethyl)-2-sulfo-3-propyl acrylate, 3-methoxy-2-sulfo-1-propyl acrylate, 2-phenyl-2-sulfoethyl acrylate, 2-(ar-sulfophenoxy)ethyl acrylate and others set forth in U.S. Pat. No. 3,024,221, and the sulfo esters of ethylenically unsaturated vicinal dicarboxylic acids, e.g., bis(2-sulfoethyl)maleate, bis(2-sulfopropyl)fumarate bis(2-sulfopropyl)itaconate, bis(3-sulfopropyl)itaconate, bis(2-sulfobutyl)fumarate, bis(2-sulfobutyl)maleate, bis(3-sulfobutyl)itaconate, and the like. Of the sulfohydrocarbyl esters, those of the α-methylene carboxylic acids are preferred, especially 2-sulfoethyl methacrylate.

Exemplary ethylenically unsaturated comonomers which are suitably copolymerized with the suitable sulfohydrocarbyl esters include the monovinylidene aromatic compounds, e.g., styrene, α-methylstyrene, ar-(t-butyl)styrene, α,ar-dimethylstyrene, ar-methylstyrene, ar-chlorostyrene, ar-methoxystyrene, ar-hydroxymethylstyrene, vinyl naphthalene, ar-cyanostyrene and the like; esters of α,β-ethylenically unsaturated carboxylic acids including the alkyl lower haloalkyl, cycloalkyl, hydroxyalkyl, esters of such acids, e.g., ethyl acrylate, butyl acrylate, methyl and alkoxy alkyl methacrylate, glycol diacrylate, diethyl maleate, ethyl hydrogen maleate, dimethyl fumarate, lauryl methacrylate, cyclohexylchloroacrylate, 2-chloroethyl methacrylate, 3,3-dimethylbutyl ethacrylate, 2-hydroxyethyl acrylate, 2-methoxy ethyl acrylate, and similar esters of itaconic, citraconic and aconitic acid and aryl esters of such acids, e.g., phenyl acrylate and tolyl methacrylate; $\alpha,\beta$-ethylenically unsaturated esters of non-polymerizable carboxylic acids, e.g., vinyl acetate, vinyl propionate, vinyl benzoate, vinyl ar-toluate and vinyl trichloroacetate; $\alpha,\beta$-ethylenically unsaturated nitriles, e.g., acrylonitrile, methacrylonitrile, fumaronitrile; $\alpha,\beta$-ethylenically unsaturated carboxylic acid such as acrylic acid, methacrylic acid, itaconic acid, maleic acid and anhydric, fumaric acid, citraconic acid, and aconitic acid; $\alpha,\beta$-ethylenically unsaturated halides, e.g., vinyl chloride, vinylidene chloride and vinyl bromide; conjugated aliphatic dienes, e.g., butadiene and isoprene and other ethylenically unsaturated monomers such as vinyl ethyl ether, methyl vinyl ketone, vinyl carbazole, vinylidene cyanide acrylamide methacrylamide and other comonomers disclosed in U.S. Pat. No. 3,033,833. Of the above comonomers, the comonomers which are characterized by the fact that homopolymers thereof are water-insoluble are preferred, with the alkyl acrylates being especially preferred. For the purposes of this invention the term "alkyl acrylate" includes the alkyl esters of acrylic acid, methacrylic acid and other $\alpha$-substituted acrylic acids. Such alkyl acrylates preferably have alkyl moieties of 1 to 12 carbon atoms.

Preferred coalescing aids are the copolymers of the preferred ethylenically unsaturated monomers and the sulfoalkyl esters of $\alpha$-methylene carboxylic acids, for example, copolymers of n-butyl acrylate and 2-sulfoethyl methacrylate, copolymers of styrene and 2-sulfoethyl methacrylate and copolymers of acrylonitrile and 2-sulfoethyl methacrylate and other copolymers wherein alkyl of the sulfoalkyl ester has from 2 to 12 carbon atoms. Especially preferred coalescing aids are the copolymers of the alkyl acrylates having alkyl moieties from 1 to 12 carbon atoms and the sulfoalkyl esters of $\alpha$-methylene carboxylic acids, and in particular, a copolymer of 70 weight percent of n-butyl acrylate and 30 weight percent of 2-sulfoethyl methacrylate. Other preferred and suitable copolymers and methods for the preparation thereof are described in U.S. Pat. No. 3,033,833 which is incorporated herein in its entirety.

Stabilizing emulsifiers suitable for the purposes of this invention are the water soluble anionic and non-ionic surfactants, with anionic or mixtures of anionic and non-ionic being preferred. Non-ionic surfactants which are suitable include the polyethenoxy agents, e.g., the ethylene glycol polyethers, the ethylene nonyl phenol polyethers, and the like; the fatty acid esters of polyhydric alcohols, e.g., propylene glycol fatty acid ester; and others set forth in Becher, Emulsions: Theory and Practice, 2nd ed., Reinhold Publishing Corporation, New York, 221-225 (1965). Anionic surfactants, which are generally preferred over suitable non-ionic surfactants, include water soluble soaps of soap-forming monocarboxylic acids, e.g., alkali metal salts of linoleic acid dimer; and sulfated and sulfonated compounds having the general formula $R - O SO_3M$ and $R - SO_3M$, wherein R represents an organic radical having from 9 to 23 carbon atoms and M represents an alkali metal, an ammonium or amine group. Examples of the sulfonate and sulfate emulsifiers include sodium dodecyl benzene sulfonate, sodium oleyl sulfate, ammonium dodecyl benzene sulfonate, potassium lauryl sulfate, sodium dodecyl diphenyl oxide disulfonate, dioctyl potassium sulfosuccinate, dihexyl sodium sulfosuccinate, and the aryl sulfonate-formaldehyde condensation products. Choice of emulsifiers varies with the emulsion system, particle size desired, and so forth. In systems where a particle size ranging from about 4 to 5 microns is desired; sodium dodecyl benzene sulfonate is preferred.

In some instances it is preferable to include a small amount, i.e., up to about 1 weight percent based on total monomer, of an electrolyte in the polymerization recipe in order to keep the formation of coagulum at a minimum and to increase the degree of liquid encapsulation. However, the use of an electrolyte is not a critical requirement of this invention. Examples of electrolytes which may be used, if desirable, include the alkali metal and ammonium salts such as sodium sulfate, potassium bisulfate, sodium nitrate, ammonium sulfate and the like.

The process of this invention is emulsion polymerization of one or more suitable monomers carried out in the presence of from about 0.5 weight percent to about 4 weight percent of a suitable stabilizing emulsifier and from about 0.2 weight percent to about 2 weight percent of a suitable polymer of a sulfohydrocarbyl ester, both percentages being based on total emulsion polymerizable monomer (hereinafter referred to as total monomer).

Concentration of emulsifier is critical in the process of this invention in that in the absence of emulsifier the polymer coagulates completely and in the presence of excess emulsifier the desired partial coalescence is not effected by the copolymer of the sulfohydrocarbyl ester. In preferred practices the concentration of emulsifier is within the range of from about 1 to about 3 weight percent based on total monomer.

Concentration of the polymer of sulfohydrocarbyl ester is likewise critical since no encapsulation is observed in its absence and only very little encapsulation and a substantial amount of coagulum are observed in its excess. Different concentrations of the polymer of sulfohydrocarbyl ester within the operable range of from about 0.2 to about 2 weight percent based on total monomer affect the size of the resulting microspheres. Larger amounts, e.g., about 2 weight percent, of the polymer of sulfohydrocarbyl ester generally have the effect of decreasing the size of the microsphere, usually an average diameter from about 0.5 to about 3 microns. Preferred concentrations of the polymer of sulfohydrocarbyl ester range from about 0.25 weight percent to about 1 weight percent, especially for preparing microspheres having an average diameter ranging from about 1 to about 5 microns.

If the method of this invention is carried out in the presence of an electrolyte in addition to an emulsifier and a polymer of a sulfohydrocarbyl ester, it is desirable that said electrolyte be present in concentrations from about 0.2 weight percent to about 1 weight percent based on total monomer, preferably from about 0.25 to about 0.5 weight percent.

In preparing microspheres having liquid centers by the method of this invention it is necessary to use concentrations of the liquid to be encapsulated less than about 50 volume percent based on the oil phase of liquid and monomer, with the best results being attained at concentrations from about 15 to about 20 volume percent.

In addition, the ratio of the volume of the oil phase to the volume of the aqueous phase also has a decided effect on the amount of liquid which is encapsulated in the microspheres. For example, with 27 volume percent of neopentane, based on the oil phase, the greatest degree of encapsulation is observed in a system having a total oil concentration of 44 volume percent based on the total aqueous and oil phases. In this system, increasing the total oil phase above 44 volume percent results in decreased encapsulation and increased formation of coagulum. In another example where from 27 to 40 volume percent of neohexane is used, the largest amount of encapsulation is observed in a system having a total oil phase of 55 volume percent based on the total aqueous and oil phases. Thus it appears that operable limits of total oil phase vary somewhat with the liquid to be encapsulated and in all likelihood with the particular monomer or monomers used. However, as a general rule, total oil phase concentrations from about 33 volume percent to about 55 volume percent based on the total oil and aqueous phases are operable, with concentrations from about 44 to about 55 volume percent being preferred.

The method of this invention is carried out by first dispersing an oil phase containing at least one emulsion polymerizable monomer in an aqueous phase containing a stabilizing emulsifier and a suitable coalescing aid. The dispersion is preferably achieved by subjecting the two phases to high shear mixing conditions, for example, a homogenizing device, a Waring blender and the like. In the preparation of microspheres, encapsulation of the liquid is not accomplished unless a dispersion of the phases is achieved.

The resulting dispersion of the oil and aqueous phases is charged to a suitable reaction vessel and subjected to conditions of emulsion polymerization, for example, initiation by a free-radical type catalyst such as potassium persulfate at a temperature from about 60° C to about 100° C and agitation of the dispersion during the polymerization period. The emulsion polymerization is usually carried out in the presence of from about 0.01 to about 3 weight percent based on the total monomer weight of the free radical producing catalyst. Suitable catalysts conveniently are the per-oxygen compounds, especially the inorganic persulfate compounds such as sodium persulfate, potassium persulfate, ammonium persulfate; the peroxides such as hydrogen peroxide; the organic hydroperoxides, for example, cumene hydroperoxide and t-butyl hydroperoxide; the organic peroxides, for example, benzoyl peroxide, acetyl peroxide, lauroyl peroxide, peracetic acid, and perbenzoic acid—sometimes activated by a water-soluble reducing agent such as a ferrous compound or sodium bisulfite—and other free-radical producing materials such as 2,2'-azobisisobutyronitrile.

The following examples are given to illustrate the invention, but are not to be read as limiting its scope. In the following specification and claims all parts and percentages are by weight unless otherwise indicated.

EXAMPLE 1

A 1.25 gram-portion of 2-hydroxyethyl acrylate and 98.75 grams of methyl methacrylate were mixed in 25 grams of neohexane. This oil mixture was mixed with an aqueous solution of 125 grams of deionized water, 0.5 gram of sodium sulfate, 0.5 gram of potassium persulfate, 1.0 gram of sodium dodecyl benzene sulfonate and 1.0 gram of a copolymer of 30 percent (∼22 mole percent) of 2-sulfoethyl methacrylate and 70 percent (∼78 mole percent) of butyl acrylate. The mixture was passed through a hand homogenizer to obtain intimate mixing of the oil and aqueous media. The intimate mixture was poured into a citrate bottle and then was agitated by tumbling the bottle end-over-end at about 4.5 rpm for a period of 16 hours in a water bath at a temperature of 70° C. At the end of the sixteen hour period 94 percent of the charge was recovered in addition to a small amount of coagulum. Under an optical microscope the reaction product was shown to consist of microspheres having a uniform size of about 1 micron with only a few particles as large as 5 microns. In order to show the presence of a liquid inclusion, a film containing the microspheres was cast upon a flat surface and allowed to dry at room temperature overnight. By heating this film in a vacuum oven at 150° C and measuring the loss of weight, it was found that the dry film contained 12 percent neohexane. Inclusion of liquid in the microspheres was further confirmed by observation of the Brownian motion of a bubble on the surface of the encapsulated liquid.

EXAMPLES 2–13

Following the procedure of Example 1, except using varying amounts of sodium sulfate, sodium dodecyl benzene sulfonate and the copolymer of 2-sulfoethyl methacrylate and butyl acrylate, numerous examples were carried out to determine the effect of concentration of these components. Results of these examples, in addition to Example 1, are shown in the Table I for the purposes of comparison.

TABLE I

| Example No. | Sodium Dodecyl Benzene Sulfonate, gram | Sodium Sulfate, gram | 30/70 SEM/BA gram (1) | % Coagulum (2) | Microsphere size, μ (3) | % Solids (Air dried) (4) | Encapsulation Efficiency, % (5) |
|---|---|---|---|---|---|---|---|
| 1 | 1.0 | 0.50 | 1.0 | 2 | 1–5 | 49.4 | 80.5 |
| 2 | 1.0 | 0.50 | 0.5 | 2 | 1–5 | 49.6 | 89.0 |
| 3 | 1.0 | — | 0.5 | 75 | 1–6 | 35.1 | 26.5 |
| 4 | 1.0 | 0.25 | 0.5 | 2 | 1–3 | 49.1 | 79.5 |
| 5 | 2.0 | 0.25 | 0.5 | 1 | 1–4 | 50.2 | 84.5 |
| 6 | 3.0 | — | 0.5 | 50 | 1–3 | 44.6 | 38.5 |
| 7 | 3.0 | 0.25 | 0.5 | 20 | 1–4 | 46.8 | 49.5 |
| 8 | 1.0 | 0.25 | 1.0 | 1 | 1–3 | 48.3 | 73.0 |
| 9 | 2.0 | 0.25 | 1.0 | 1 | 1–4 | 48.6 | 71.0 |
| 10 | 3.0 | 0.25 | 1.0 | 2 | 1–5 | 47.3 | 50.5 |
| 11 | 1.0 | 0.25 | 1.5 | 1 | 1–3 | 49.1 | 76.5 |
| 12 | 2.0 | 0.25 | 1.5 | 1 | 1–3 | 47.8 | 58.0 |
| 13 | 3.0 | 0.25 | 1.5 | 1 | 1–3 | 47.2 | 48.5 |

EXAMPLES 14–18

Several polymerization recipes were prepared and polymerized according to Example 1 except that various emulsifiers were substituted for sodium dodecyl benzene sulfonate and the polymerization was carried out at 90° C in 4 hours. Results of these examples are shown in Table II.

TABLE II

| Example No. | Emulsifier (1) | % Coagulum (2) | Microsphere Size, μ (3) | % Solids (Air dried) (4) | Encapsulation Efficiency % (5) |
|---|---|---|---|---|---|
| 14 | Sodium dodecyl benzene sulfonate | 1 | 1–3 | 49.7 | 84.5 |
| 15 | Sodium dodecyl diphenyl oxide disulfonate | 7 | 2–3 | 48.1 | 91.0 |
| 16 | Dihexyl ester of sodium sulfosuccinic acid | 20 | 1–2 | 42.4 | 49.5 |
| 17 | Dioctyl ester of sodium sulfosuccinic acid | 20 | 1–2 | 43.2 | 25.5 |
| 18 | Alkyl benzene sodium sulfonate | 8 | 1–3 | 49.5 | 91.0 |

(1) Emulsifier in concentration of 1 weight percent based on total monomer.
(2)–(5) Same as in Table I.

EXAMPLES 19–27

An oil phase consisting of 50 parts of styrene, 1.0 part of 2-hydroxyethyl acrylate and 50 parts of low molecular weight liquid polybutadiene and an aqueous phase consisting of 0.5 parts of potassium persulfate, 0.5 part of sodium sulfate, 1.0 part of copolymer of 30 percent of 2-sulfoethyl methacrylate and 70 percent of butyl acrylate, and 100.0 parts of deionized water were intimately mixed by using a hand homogenizer. The intimate mixture was poured into a citrate bottle and then was agitated by tumbling the bottle end-over-end at about 4.5 rpm for a period of 16 hours in a water bath at a temperature of 70° C. The particles formed were of two separate phases. Microscopic observation indicated that a shell of polystyrene encompassed the low molecular weight polybutadiene. Similar recipes except containing different coalescing aids were prepared and polymerized according to the above procedure. The results of these examples are shown in Table III.

TABLE III

| Example No. | Coalescing Aid | % Recovery (1) | % Conversion (2) | Maximum Size of Microsphere, (3) |
|---|---|---|---|---|
| 19 | 30/70 (22/78) SEM/BA* | 97.9 | 96.5 | 20 |
| 20 | 50/50 (40/60) SEM/BA* | 97.6 | 94.7 | 30 |
| 21 | 20/80 (14/86) SEM/BA* | 98.1 | 97.1 | 35 |
| 22 | 70/30 (61/39) SEM/BA* | 29.9 | 58.8 | 20 |
| 23 | 50/50 (35/65) SEM/STY* | 42.0 | 62.4 | 5 |
| 24 | 70/30 (55/45) SEM/STY* | 29.4 | 39.9 | 3 |
| 25 | 70/30 (39/61) SEM/VCN* | 17.1 | 36.4 | 4 |
| 26 | 50/50 (22/78) SEM/VCN* | 2.4 | 43.2 | 4 |
| 27 | 100 SEM* | 27.4 | 41.7 | 8 |

*Where the first numerical ratio is the weight ratio of sulfo ester to ethylenically unsaturated monomer, SEM is 2-sulfoethyl methacrylate, STY is styrene, VCN is acrylonitrile and BA is butyl acrylate. Approximate mole ratio is given in ( ).
(1) Weight percent of polymeric microspheres based on oil phase.
(2) Weight percent of polymer formed, based on monomer weight.
(3) Diameter of largest particle in microns as determined by an optical microscope.

As indicated by the preceding table, copolymers of the sulfo ester and butyl acrylate were the most effective coalescing aids, particularly the coalescing aids used in Examples 19–21.

EXAMPLES 28–35

An oil phase consisting of 20 parts of low molecular weight liquid polybutadiene, 80 parts of styrene and 1.00 part of 2-hydroxyethyl acrylate and an aqueous phase according to Example 19 were intimately mixed by the use of a hand homogenizer. The intimate mixture was poured into a citrate bottle and polymerized according to the procedure of Example 19. The results are shown in Table IV. For the purposes of comparison several polymerization recipes containing the same amount of the various coalescing aids used in Examples 20–27 were polymerized in a similar manner and the results thereof are also shown in Table IV.

TABLE IV

| Ex. No. | Coalescing Aid | % Recovery (1) | % Conversion (2) | Maximum Size of Microspheres (3) |
|---|---|---|---|---|
| 28 | 30/70 SEM/BA* | 97.6 | 100.0 | 25 |
| 29 | 50/50 SEM/BA* | 98.0 | 96.1 | 25 |
| 30 | 20/80 SEM/BA* | 98.6 | 97.6 | 20 |
| 31 | 70/30 SEM/BA* | 92.0 | 94.0 | 20 |
| 32 | 50/50 SEM/STY* | 96.9 | 84.5 | 12 |
| 33 | 70/30 SEM/STY* | 87.2 | 84.1 | 10 |
| 34 | 70/30 SEM/VCN* | 93.0 | 84.7 | 8 |
| 35 | 100 SEM* | 90.5 | 91.6 | 8 |

*See Table III.
(1)–(3) Same as in Table III.

Again the copolymers of the sulfo ester and n-butyl acrylate were observed to be the best coalescing aids.

EXAMPLE 36

An oil phase containing 10 parts of acrylonitrile, 45 parts styrene, and 45 parts of liquid polybutadiene and the aqueous phase of Example 18 were mixed and polymerized according to procedure of Example 18. Results of 97 percent recovery, 96 percent conversion and microspheres ranging in size from less than one to twenty microns were observed.

EXAMPLE 37

The following ingredients were placed into a 12-ounce citrate bottle:

| | Concentration (gms) |
|---|---|
| Styrene | 50.0 |
| Deionized Water | 150.0 |
| Sodium Sulfate | 0.5 |
| Potassium Persulfate | 0.5 |
| Sodium Dodecyl Benzene Sulfonate | 3.0 |
| Copolymer of 30 percent of 2-sulfoethyl methacrylate and 70 percent of n-butyl | |

-continued

| | Concentration (gms) |
|---|---|
| acrylate | 0.5 |

The bottle and contents were cooled in ice and 50 grams of liquid butadiene was added to the contents. The bottle was capped and tumbled in a 70° C water bath for 24 hours after which the bottle was opened and the contents filtered. The contents consisted of 20 grams of coagulum and 235 grams of an aqueous dispersion having 38.7 percent polymer solids. The particles of the dispersion were examined under an optical microscope and most were found to have diameters ranging from about 6 to about 18 microns, with some particles having diameters as small as 1 to 2 microns. The aqueous dispersion was readily concentrated to high solids by evaporation.

What is claimed is:

1. An emulsion polymerization method for preparing microspheres having liquid centers and seamless rigid walls of a normally solid, organic polymer, said method comprising (1) admixing a water-insoluble, non-polymerizable, substantially inert liquid with a total monomer of at least one emulsion polymerizable, ethylenically unsaturated monomer, said liquid being soluble in the monomer and insoluble in said organic polymer and being present in amount sufficient to constitute from about 33 to about 55 volume percent of the total of monomers, non-polymerizable liquid and aqueous medium but less than 50 volume percent of the total of monomer and non-polymerizable liquid, said total monomer being capable of polymerization to form a water-insoluble polymer; (2) dispersing the resulting mixture in an aqueous medium containing from about 0.5 to about 4 weight percent based on total monomer of a stabilizing emulsifier and from about 0.2 to about 2 weight percent based on total monomer of an at least inherently water-dispersible polymer of a sulfohydrocarbyl ester of an $\alpha,\beta$-ethylenically unsaturated carboxylic acid, said polymer containing at least one milliequivalent of sulfo groups per gram of polymer; and (3) subjecting the dispersion to emulsion polymerization conditions whereby the polymer of the sulfohydrocarbyl ester acts as a coalescing aid and the total monomer polymerizes to form microspheres of a water-insoluble polymer encapsulating said non-polymerizable liquid.

2. An emulsion polymerization method for preparing microspheres having liquid centers and seamless rigid walls of a normally solid, organic polymer, said method comprising (1) admixing a water-insoluble, non-polymerizable, substantially inert liquid with a total monomer of at least one emulsion polymerizable, ethylenically unsaturated monomer; (2) dispersing the resulting mixture in an aqueous medium containing from about 0.5 to about 4 weight percent based on total monomer of a stabilizing emulsifer and from about 0.2 to about 2 weight percent based on total monomer of a water-soluble copolymer of a sulfohydrocarbyl ester of an $\alpha,\beta$-ethylenically unsaturated carboxylic acid; and (3) subjecting the dispersion to emulsion polymerization conditions whereby the polymer of the sulfohydrocarbyl ester acts as a coalescing aid and the total monomer polymerizes to form microspheres of a water-insoluble polymer encapsulating said non-polymerizable liquid, said emulsifier being a water-soluble anionic or non-ionic surfactant or mixture thereof provided than when the emulsifier is a sulfate or sulfonate compound it has the general formula R—$OSO_3M$ or R—$SO_3M$, wherein R represents an organic radical having from 9 to 23 carbon atoms and M represents an alkali metal or an ammonium group, said copolymer of sulfohydrocarbyl ester being a copolymer of (a) a sulfohydrocarbyl ester of $\alpha,\beta$-ethylenically unsaturated carboxylic acid wherein the ester moiety has the structure —Q—$SO_3M$ wherein Q is a divalent organic radical having a hydrocarbon backbone and its valence bonds on different carbon atom provided that Q is free of any substituent group which reacts with $SO_3M$ to form a water-insoluble salt or which interferes with emulsion polymerization of total monomer, and M is a cation which disassociates from —$SO_3$ in water and (b) an $\alpha,\beta$-ethylenically unsaturated comonomer capable of being homopolymerized to an essentially water-insoluble homopolymer, provided that said comonomer is free of any group capable of reacting with —$SO_3M$ to form a water-insoluble salt or capable of interfering with emulsion polymerization of total monomer wherein said copolymer contains from about 1 to about 5.5 milliequivalents of sulfo groups per gram of said copolymer, said liquid being nonreactive with said total monomer and the polymer formed therefrom, being soluble in the total monomer and insoluble in said organic polymer and being present in amount sufficient to constitute from about 33 to about 55 volume percent of the combined amount of total monomer, non-polymerizable liquid and aqueous medium but less than 50 volume percent of the combined amount of total monomer and non-polymerizable liquid and further provided that said liquid does not inhibit the emulsion polymerization of said total monomer, said total emulsion polymerizable monomer being inert to the copolymer of the sulfohydrocarbyl ester and containing up to 10 weight percent of a special purpose monomer selected from the group consisting of $\alpha,\beta$-ethylenically unsaturated carboxylic acid, 2-hydroxyethyl acrylate, 2-sulfoethylmethacrylate and a crosslinking, polyethylenically unsaturated emulsion polymerizable monomer.

3. The method of claim 2 wherein Q is alkylene, arylene, aralkylene, haloalkylene, haloarylene, alkoxyalkylene, haloalkylalkylene, haloarylalkylene, aryloxyalkylene, cycloalkylene, alkoxyarylene or aryloxyalkylene and M is hydrogen ion, ammonium or metal cation; the emulsifier is selected from the group consisting of polyethenoxy agents, fatty acid esters of polyhydric alcohols, soaps of soap-forming monocarboxylic acids, sodium dodecyl benzene sulfonate, sodium oleyl sulfate, ammonium dodecyl benzene sulfonate, potassium lauryl sulfate, sodium dodecyl diphenyl oxide disulfonate, dioctyl potassium sulfosuccinate, and dihexyl sodium sulfosuccinate, and the non-polymerizable liquid is a hydrocarbon or a halohydrocarbon.

4. The method of claim 3 wherein said comonomer is an alkyl acrylate, a monovinylidene aromatic monomer, or an $\alpha,\beta$-ethylenically unsaturated carboxylic acid.

5. The method of claim 4 wherein the copolymer is a copolymer of about 22 mole percent of 2-sulfoethyl methacrylate and 78 mole percent of n-butyl acrylate.

6. The method of claim 2 wherein the emulsion polymerizable monomer is styrene, the copolymer is a copolymer of 2-sulfoethyl methacrylate and n-butyl acrylate, the non-polymerizable liquid is hexane, and the emulsifier is sodium dodecyl benzene sulfonate.

7. The method of claim 3 wherein the emulsion polymerizable monomer is a monovinylidene aromatic monomer.

8. The method of claim 7 wherein the monovinylidene aromatic monomer is styrene.

9. The method of claim 8 wherein the total monomer is a mixture of styrene and butadiene.

10. The method of claim 3 wherein the emulsion polymerizable monomer is an alkyl acrylate.

11. The method of claim 8 wherein emulsion polymerization conditions comprise a free-radical type catalyst, temperature in the range from about 60° to about 100° C and agitation of the dispersion.

12. The method of claim 3 wherein the total monomer is a mixture of styrene and acrylonitrile.

13. The method of claim 3 wherein the emulsion polymerizable monomer is butadiene.

14. The method of claim 3 wherein the emulsion polymerizable monomer is an α,β-ethylenically unsaturated halide.

15. The method of claim 3 wherein total monomer is a mixture of monovinylidene aromatic monomer, alkyl acrylate and up to 10 weight percent of an α,β-ethylenically unsaturated carboxylic acid.

16. The method of claim 3 wherein total monomer is a mixture of monovinylidene aromatic monomer, conjugated aliphatic diene and α,β-ethylenically unsaturated nitrile.

17. The method of claim 1 wherein the polymer of the sulfohydrocarbyl ester contains from about 1 to about 5.5 milliequivalents of sulfo groups per gram of said polymer.

18. The method of claim 2 wherein the copolymer of the sulfohydrocarbyl ester contains from about 1 to about 2.6 milliequivalents of sulfo groups per gram of said copolymer.

19. The method of claim 18 wherein the copolymer of the sulfohydrocarbyl ester is a copolymer of (1) a sulfohydrocarbyl ester of α-methylene carboxylic acid wherein hydrocarbyl is alkylene and (2) an alkyl acrylate and the emulsion polymerizable monomer is selected from the group consisting of monovinylidene aromatic monomer, alkyl acrylate, α,β-ethylenically unsaturated nitrile and mixtures thereof including up to 10 weight percent of an α,β-ethylenically unsaturated carboxylic acid.

20. The method of claim 18 wherein the copolymer of the sulfohydrocarbyl ester is a copolymer of 2-sulfoethyl methacrylate and butyl acrylate and the emulsion polymerizable monomer is styrene.

* * * * *

UNITED STATES PATENT AND TRADEMARK OFFICE
CERTIFICATE OF CORRECTION

PATENT NO. : 4,075,134
DATED : February 21, 1978
INVENTOR(S) : Donald S. Morehouse, Jr.; Frank H. Bolton It is certified that error appears in the above-identified patent and that said Letters Patent are hereby corrected as shown below:

Column 4, line 13, delete "ispropenyl" and insert --isopropenyl--.

Column 4, line 39, delete "increase" and insert --increases--.

Column 4, line 40, delete "othr" and insert --other--.

Column 5, line 63, delete "substitutents" and insert --substituents--.

Column 6, line 23, the formula should read $--R''-CO_2-Q-SO_3M--$.

Column 6, line 26, delete "or" and insert --on--.

Column 6, line 27, delete "as" and insert --an--.

Column 6, line 53, insert a comma --,-- after "bis(2-sulfopropyl)fumarate".

Column 10, following Table I, the footnotes should be inserted as follows:

--(1) Copolymer of 30 percent (~22 mole percent) of 2-sulfoethyl methacrylate and 70 percent (~78 mole percent) of n-butyl acrylate.

(2) Weight percent of coagulated polymer based on monomer charge.

(3) Average diameter of microspheres as determined by an optical microscope.

UNITED STATES PATENT AND TRADEMARK OFFICE
CERTIFICATE OF CORRECTION

PATENT NO. : 4,075,134
DATED : February 21, 1978
INVENTOR(S) : Donald S. Morehouse, Jr.; Frank H. Bolton It is certified that error appears in the above-identified patent and that said Letters Patent are hereby corrected as shown below:

(4) Weight percent polymer solids.

(5) Weight percent of neohexane encapsulated, based on the amount of neohexane in the polymerization recipe.--

Column 11, line 22, "parts" should read --part--.

Column 13, line 57, delete "emulsifer" and insert --emulsifier--.

Column 13, line 67, delete "than" and insert --that--.

Signed and Sealed this

Sixteenth Day of January 1979

[SEAL]

Attest:

RUTH C. MASON
Attesting Officer

DONALD W. BANNER
Commissioner of Patents and Trademarks